Figure 1:
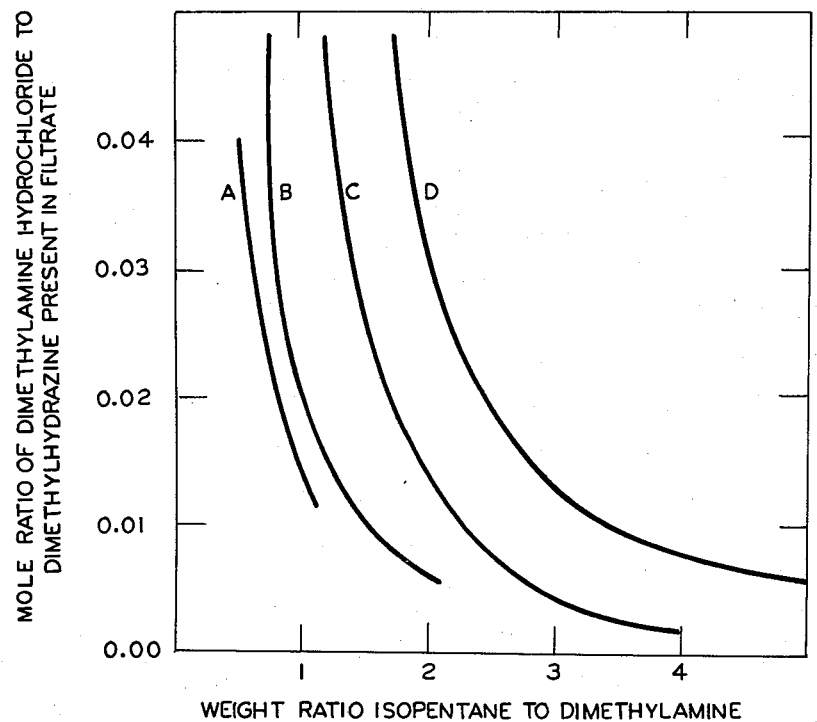

Jan. 2, 1962   F. R. HURLEY   3,015,675
SUBSTITUTED HYDRAZINE PROCESS
Filed April 4, 1958

INVENTOR.
FORREST R. HURLEY
BY Kenneth E. Prince
ATTORNEY

# United States Patent Office 3,015,675
Patented Jan. 2, 1962

3,015,675
SUBSTITUTED HYDRAZINE PROCESS
Forrest R. Hurley, Glen Burnie, Md., assignor to W. R. Grace & Co., New York, N.Y., a corporation of Connecticut
Filed Apr. 4, 1958, Ser. No. 726,403
1 Claim. (Cl. 260—583)

This invention relates to substituted hydrazines. In one specific aspect, it relates to an improvement in the process for preparing anhydrous organic substituted hydrazines and more particularly to an improved process for separating amine hydrochlorides from substituted hydrazines.

Substituted hydrazines are not uncommon. Compounds such as methylhydrazine, phenylhydrazine and hydrazobenzene are well known and their utility well established. A wide variety of synthetic approaches have been utilized in their preparation. Recently, a superior general method leading to these compounds has been discovered; it has been shown by Sisler and Kelmers, U.S. Patent 2,806,851, that chloramine reacts with primary and secondary amines under anhydrous conditions to form organic substituted hydrazines. In essence then, chloramine reacts with a liquid organic amine having a replaceable hydrogen attached to the amine nitrogen to form the anhydrous substituted hydrazine.

Chloramine can be readily obtained using the well-known process of Sisler et al., U.S. Patent 2,710,248. In that continuous process, gaseous chlorine will react almost instantaneously with gaseous ammonia under anhydrous conditions according to the equation $$2NH_3 + Cl_2 \rightarrow ClNH_2 + NH_4Cl$$

To minimize product-destroying side reactions, chloramine is allowed to react with excess amine. For each mole of substituted hydrazine produced, a mole of hydrochloride results according to the equation $$ClNH_2 + 2R_2NH \rightarrow R_2NNH_2 + R_2NH \cdot HCl$$

or more accurately $ClNH_2 + R_2NH \rightarrow R_2NNH_2 \cdot HCl$ followed by $R_2NNH_2 \cdot HCl + R_2NH \rightarrow R_2NNH_2 + R_2NH \cdot HCl$. Since the amine is the strongest base present and is present in excess, its hydrochloride salt is formed preferentially.

After the chloramine has completely reacted, the reaction mixture contains dissolved ammonia, equivalent amounts of substituted hydrazine and amine hydrochloride, and an excess of unreacted amine. Prior to this invention, no completely satisfactory method of isolating the anhydrous product had been devised. Simple distillation is not effective because of the formation of the substituted hydrazine hydrochloride by the reaction $RNH_2 \cdot HCl + RNHNH_2 \rightarrow RNH_2 + RNHNH_2 \cdot HCl$. Even though the reactant amine is a much stronger base than the resultant hydrazine, the equilibrium acid-base reaction favors the formation of the hydrazine hydrochloride as the more volatile amine is distilled away. Secondly, it has been found that the presence of ammonium chloride or amine hydrochlorides in more concentrated heated solutions containing hydrazines greatly diminish the amount of product capable of isolation. Distillation procedures using a higher boiling amine as a "chaser" or a lower boiling one as a "stripper" were not very successful. In addition to practical process difficulties, the formation of azeotropes created new problems.

Since the presence of amine hydrochloride during the work-up is so detrimental to the recovery of product, an obvious solution would be destruction or removal of the amine hydrochloride before starting to separate the product from the reaction mixture. One approach is to destroy the hydrochloride with strong inorganic base and distil the product directly from caustic. Aside from other disadvantages, this has the obvious drawback of introducing water into a system kept anhydrous up to this point. The difficulties in rendering hydrazines anhydrous are well known.

While the hydrochlorides of lower amines are soluble in an excess of the amine, some amine hydrochlorides are only partially soluble and others are insoluble and can be separated by filtration. Amines and organic substituted hydrazines, however, are soluble in hydrocarbon solvents; but amine hydrochlorides, which are salts, are insoluble. Therefore, when sufficient quantities of a hydrocarbon solvent are present in the reaction mixture, the amine hydrochloride is completely knocked out of solution and can be readily separated by filtration. The product can then be recovered anhydrous by distillation of the filtrate.

It is therefore an object of the present invention to provide a better means of separating the desired organic substituted hydrazine from the amine hydrochloride present in the reaction mixture resulting from the Sisler-Kelmers process thereby increasing the yield of the desired product with a concomitant reduction in process manipulation and cost.

The question of the solubility of amine salts in an excess of the parent amine is more complex than would be anticipated. The hydrochlorides of methylamine, dimethylamine and n-butylamine are soluble in the corresponding amines. The hydrochlorides of aniline, piperidine and pyridine are insoluble. Longer chain aliphatic amine salts, however, exhibit increasing degrees of solubility in their parent amines. Since the problem of separating the hydrochloride is a practical one, the solubility of the hydrochloride in the multicomponent reaction mixture is more important than its solubility in individual components. In addition to and in a manner similar to true solubility, supersaturation, three-phase formation and delayed crystallization cause mechanical difficulties that must be overcome in order to adequately separate the amine hydrochloride. By using the improved method of the present invention, the dissolved amine hydrochloride can be made to crystallize by the addition of the appropriate solvent.

The choice of solvent is governed by three considerations: (1) It must not interact with the reaction mixture; (2) Its boiling point must be such that the given organic substituted hydrazine be capable of separation by distillation and it would be desirable that the unreacted amine could be recovered by distillation also; (3) It must be completely miscible with the amine and resultant substituted hydrazine product; but the amine hydrochloride must be essentially insoluble. These requirements are met by the aliphatic and aromatic hydrocarbons. Aliphatic solvents such as pentane, hexane, heptane and their branched-chain isomers are suitable for the practice of this invention. Aromatic solvents such as benzene, toluene and xylene may be used as well as aliphatic ethers and other liquids which satisfy the three conditions given above. The essence of this discovery is not the solvent used or that a solvent is used or when the solvent is added but the fact that the solvent chosen will allow selective separation of the amine hydrochloride in the presence of unreacted amine from the product organic substituted hydrazine.

The proper conditions for adding the solvent were determined by experiment. It was found that efficient stirring was essential to the formation of good crystals; i.e., the production of a system with good filtration characteristics. While temperature was not a critical factor, chilling is well known to promote crystallization. With lower boiling solvents such as isopentane, cooling to 0–10° C. was necessary to prevent excessive solvent loss. All manipulations were done at atmospheric pressure but under conditions minimizing exposure of the product hydrazine to moisture or to oxygen. It was anticipated and experimentally verified that increasing the concentration of the amine would increase the solubility of its hydrochloride. Under the conditions used here (simulating the reaction mixture obtained by the Sisler-Kelmers process), it was found desirable to maintain a weight ratio of hydrocarbon solvent to substituted hydrazine product present of about 2:1 to 5:1. At lower ratios the solubility of the amine hydrochloride is sufficient to materially diminish the recovery of product. Higher ratios are operative but are not warranted costwise and in terms of increased solvent processing when compared with the minimal improvement in yield that is actually obtained. Similar considerations apply whether the solvent was initially present or was added during the work-up of the reaction mixture.

The scope and utility of this invention is further illustrated by means of the following examples:

*Example I*

Figure 2:
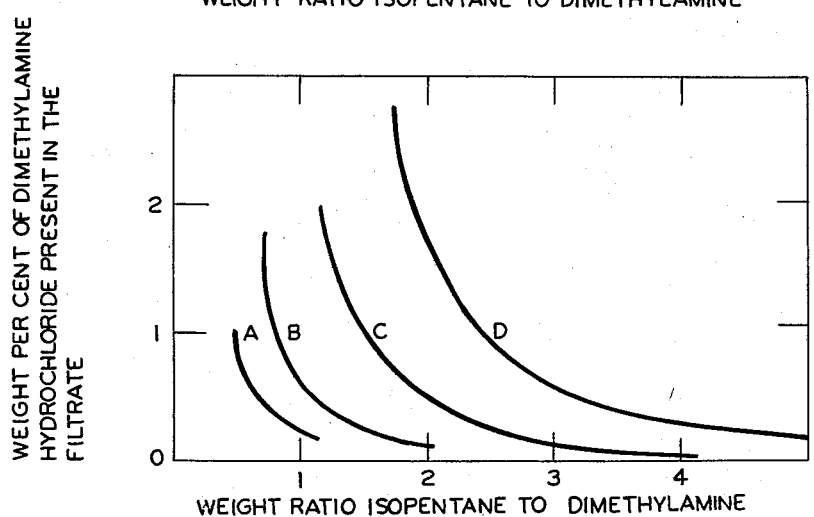

The extent to which 1,1-dimethylhydrazine may be separated from dimethylamine hydrochloride by use of isopentane is fundamentally a solubility problem in a four-component system consisting of 1,1-dimethylhydrazine, dimethylamine, dimethylamine hydrochloride and isopentane. A study of the complete system could be quite complicated and laborious but preliminary experiments indicated that for practical considerations, the solubility studies could be restricted to solutions containing more than 50 volume percent of the hydrocarbon. The solubility of dimethylamine hydrochloride was determined in four series of solutions in which the weight ratios of dimethylamine to 1,1-dimethylhydrazine were kept constant but the amount of isopentane used was progressively increased. The experimental results are summarized and tabulated below:

The ratios of dimethylamine to dimethylhydrazine in A, B, C and D are 3:1, 3:2, 1:1 and 1:2 respectively. FIGURES 1 and 2 were constructed from the data presented in the table above and show that the solubility of dimethylamine hydrochloride is increased by the presence of dimethylamine as well as by the quantity of dimethylhydrazine in solution; but that this can be compensated for by the use of more isopentane. The amount of dimethylamine hydrochloride remaining in the filtrate is important in that it will decrease the recovery of dimethylhydrazine as previously discussed.

*Example II*

Preliminary experiments with n-heptane used synthetic mixtures containing approximately 7.6 g. of dimethylamine hydrochloride, 5 ml. of 1,1-dimethylhydrazine and varying amounts of dimethylamine and heptane. The order of addition of components to the synthesis mixture was not critical provided stirring was adequate to disperse the two liquid phases until all the 1,1-dimethylhydrazine and dimethylamine dissolved in the heptane phase and the dimethylamine hydrochloride had crystallized. It was observed that at certain dimethylamine concentrations the system at equilibrium consisted of two liquid phases in addition to the solid phase. This shows that liquid-liquid equilibria also exist but in a concentration range relatively unimportant to the problem at hand. In these experiments dimethylamine was evaporated to its equilibrium concentration at the final temperature of the mixture. Very large crystals of dimethylamine hydrochloride were obtained. The amount of 1,1-dimethylhydrazine with respect to the dimethylamine hydrochloride and n-heptane in the final solution were calculated and are summarized below:

| Final Temp. of Mixture, °C | Weight ratio n-heptane to dimethylhydrazine | Mole ratio dimethylamine hydrochloride to dimethylhydrazine | Percent of total dimethylhydrazine |
|---|---|---|---|
| 15 | 1.7 | 0.2 | 89 |
| 15 | 4.3 | 0.002 | 90 |
| 15 | 8.6 | 0 | 99.4 |
| 20 | 4.3 | 0.001 | 98 |
| 20 | 4.3 | 0 | 98 |
| 25 | 4.3 | 0.001 | 99.7 |

| | Initial Concentration in Grams (Each system contains 26 g. of dimethylamine hydrochloride) | | | Relationships Present in Filtrate | | | |
|---|---|---|---|---|---|---|---|
| | dimethylamine | dimethyl hydrazine | isopentane | wt. percent dimethylamine hydrochloride | mole ratio dimethylamine hydrochloride to dimethylhydrazine | wt. ratio isopentane to dimethylamine | wt. ratio isopentane to dimethylhydrazine |
| A | 120.0 | 40.0 | 62.0 | 0.94 | 0.038 | 0.52 | 1.55 |
|   | 117.0 | 38.8 | 75.6 | 0.60 | 0.026 | 0.64 | 1.95 |
|   | 113.4 | 37.6 | 89.0 | 0.43 | 0.020 | 0.78 | 2.33 |
|   | 110.0 | 36.7 | 12.0 | 0.34 | 0.017 | 0.93 | 2.78 |
|   | 107.4 | 35.7 | 115.0 | 0.22 | 0.012 | 1.07 | 3.22 |
| B | 63.2 | 39.7 | 45.7 | 1.72 | 0.048 | 0.72 | 1.15 |
|   | 63.2 | 39.7 | 61.0 | 0.70 | 0.021 | 0.96 | 1.54 |
|   | 60.6 | 38.0 | 73.8 | 0.43 | 0.014 | 1.22 | 1.94 |
|   | 58.3 | 36.4 | 86.1 | 0.29 | 0.011 | 1.48 | 2.36 |
|   | 56.1 | 35.0 | 98.2 | 0.21 | 0.008 | 1.75 | 2.80 |
|   | 54.1 | 33.9 | 110.0 | 0.14 | 0.006 | 2.03 | 3.25 |
| C | 42.1 | 41.1 | 49.0 | 1.93 | 0.047 | 1.16 | 1.19 |
|   | 42.1 | 41.1 | 61.5 | 1.02 | 0.028 | 1.46 | 1.50 |
|   | 39.1 | 38.2 | 72.5 | 0.58 | 0.017 | 1.86 | 1.89 |
|   | 37.3 | 36.5 | 84.5 | 0.33 | 0.010 | 2.26 | 2.32 |
|   | 35.7 | 35.0 | 96.4 | 0.18 | 0.006 | 2.70 | 2.75 |
|   | 34.3 | 33.5 | 108.0 | 0.07 | 0.003 | 3.15 | 3.22 |
|   | 32.9 | 32.2 | 135.0 | 0.08 | 0.004 | 4.10 | 4.20 |
| D | 20.0 | 40.0 | 34.7 | 2.67 | 0.048 | 1.73 | 0.87 |
|   | 20.0 | 40.0 | 46.5 | 1.15 | 0.022 | 2.32 | 1.16 |
|   | 18.7 | 37.5 | 59.0 | 0.54 | 0.012 | 3.16 | 1.57 |
|   | 17.5 | 35.2 | 71.0 | 0.30 | 0.008 | 4.05 | 2.02 |
|   | 16.6 | 33.2 | 82.6 | 0.19 | 0.006 | 4.97 | 2.48 |
|   | 15.7 | 31.6 | 93.8 | 0.12 | 0.004 | 5.97 | 2.96 |

Example III

Four experiments clearly illustrate the value of n-heptane in decreasing the solubility of dimethylamine hydrochloride in the synthesis mixture at given dimethylamine concentrations.

| Weight ratio dimethylamine to dimethyhydrazine | Weight ratio n-heptane to dimethylhydrazine | Weight percent dimethylamine hydrochloride | Mole ratio dimethylamine hydrochloride to dimethylhydrazine |
|---|---|---|---|
| 1.2:1 | 1.2:1 | 1.6 | 0.41 |
| 1.2:1 | 4.6:1 | 0.083 | 0.026 |
| 0.80:1 | 1.0:1 | 1.8 | 0.37 |
| 0.80:1 | 1.8:1 | 0.40 | 0.10 |

Example IV

A synthesis mixture with the following composition (parts by weight); dimethylamine (48), dimethylamine hydrochloride (34) and 1,1-dimethylhydrazine (19) was heated to reflux at atmospheric pressure. Even at the temperature of boiling, a small quantity of dimethylamine hydrochloride remained undissolved. A total volume of 75 ml. of n-heptane was added at a rate of 15 ml. per minute to approximately 100 g. of the boiling mixture. Crystals of the amine hydrochloride formed immediately and no second liquid phase was ever apparent. The crystal slurry was cooled to ca. 5° C., filtered and washed with three 35 ml. portions of n-heptane at room temperature. Only 0.15% of the total dimethylhydrazine being processed remained in the washed crystals and better than 98% was recovered on distillation of the combined filtrate and washings. Even at this high amine concentration, only 1.5% of the dimethylamine hydrochloride was found dissolved in the heptane-amine filtrate.

Example V

Ammonium chloride (5 g.) was dissolved in enough dimethylamine to give 45 ml. of solution. Five ml. of 1,1-dimethylhydrazine was added followed by 50 ml. of n-heptane. After stirring for one minute, crystallization appeared complete. The reaction mixture was kept at 15° C. for 30 minutes, filtered and the residue thoroughly washed with solvent. The filtrate and washings contained 99.4% of the total 1,1-dimethylhydrazine and no chloride.

Example VI

Ammonium chloride (5.3 g.) was dissolved in 30 ml. of dimethylamine. The amine was then evaporated slowly until a very thick slurry of dimethylamine hydrochloride crystals was obtained. When 5 ml. of 1,1-dimethylhydrazine was added, most of the crystals dissolved. The reaction mixture was again evaporated to a thick slurry of crystals (about 10 ml.) and 25 ml. of n-heptane was added with vigorous stirring. All of the dimethylamine hydrochloride crystallized immediately while the filtrate and washings contained 98% of the hydrazine and no chloride.

Example VII

Ammonium chloride (5 g.) was dissolved in enough dimethylamine to give 30 ml. of solution. After the addition of 5 ml. of 1,1-dimethylhydrazine, the mixture was poured slowly into 25 ml. of stirred n-heptane. Small droplets of an amine-rich phase were dispersed throughout the heptane-rich phase. As the amine-rich phase gradually disappeared (requiring about 10 minutes), the quantity of crystals increased. The two liquid phases persisted for about 10 minutes; stirring was continued for an additional 40 minutes. At a final temperature of 25° C., the synthesis mixture was filtered and the residue washed three times with 10 ml. portions of solvent. The filtrate and washings contained 99.7% of the 1,1-dimethylhydrazine and chloride equivalent to 0.1% of the product.

Example VIII

One gram of dimethylamine hydrochloride was dissolved in 15.5 g. of dimethylamine and 25 ml. of 1,1-dimethylhydrazine added. On the slow addition of n-heptane, crystallization started after 30 ml. had been added and appeared almost complete after the addition of 35 ml. A total of 50 ml. of solvent was added, the reaction mixture filtered and the residue washed with 100 ml. of heptane. The filtrate and washings contained all of the hydrazine and chloride equivalent to about 1.0% of the dimethylhydrazine.

Example IX

One gram of dimethylamine hydrochloride was dissolved in 23 g. of dimethylamine followed by the addition of 25 ml. of 1,1-dimethylhydrazine. No crystals appeared after the addition of 35 ml. of n-heptane but a sizeable precipitate resulted after the addition of 5 ml. more. A total of 130 ml. of heptane was added, the reaction mixture and the residue washed three times with 20 ml. portions of solvent. The filtrate and washings contained all of the hydrazine and chloride equivalent to 0.26% of the product.

I claim:

In a method of forming dimethylhydrazine comprising passing an ammonia-stabilized anhydrous chloramine mixture into dimethylamine, wherein a reaction mixture containing dimethylhydrazine, dimethylamine hydrochloride, and free dimethylamine results; maintaining sufficient ammonia in the reaction mixture to provide alkaline conditions therein; and recovering the dimethylhydrazine formed, the improvement in recovering the dimethylhydrazine in an anhydrous condition when said reaction mixture contains free dimethylamine in amounts less than about 3 parts by weight of dimethylamine per part of said dimethylhydrazine formed, which consists in adding to the reaction mixture 2 to 5 parts by weight of a hydrocarbon solvent selected from the group consisting of pentane, hexane, heptane, benzene, toluene and xylene per part of said dimethylhydrazine, thereby causing the dimethylamine hydrochloride to crystallize from solution; removing said hydrochloride by filtration; and recovering said dimethylhydrazine from the reaction mixture.

References Cited in the file of this patent

UNITED STATES PATENTS

| 1,878,970 | Mills | Sept. 20, 1932 |
| 2,806,851 | Sisler et al. | Sept. 17, 1957 |

OTHER REFERENCES

Sherwood: "Absorption and Extraction," Chemical Engineering Series, McGraw-Hill Book Co., Inc., 1937, page 237.

Fieser: Organic Chemistry, D. C. Heath and Co., Boston, 2nd ed., 1950, page 223.

UNITED STATES PATENT OFFICE
CERTIFICATE OF CORRECTION

Patent No. 3,015,675                            January 2, 1962

Forrest R. Hurley

It is hereby certified that error appears in the above numbered patent requiring correction and that the said Letters Patent should read as corrected below.

Columns 3 and 4, in the table, under the heading "isopentane", line 4 thereof, for "12.0" read -- 102.0 --.

Signed and sealed this 26th day of June 1962.

(SEAL)
Attest:

ERNEST W. SWIDER
Attesting Officer

DAVID L. LADD
Commissioner of Patents